(12) United States Patent
Hayashi et al.

(10) Patent No.: US 8,504,764 B2
(45) Date of Patent: Aug. 6, 2013

(54) METHOD AND APPARATUS TO MANAGE OBJECT-BASED TIERS

(75) Inventors: Shinichi Hayashi, San Jose, CA (US); Keiichi Matsuzawa, Arlington, MA (US); Toshio Otani, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 261 days.

(21) Appl. No.: 12/871,082

(22) Filed: Aug. 30, 2010

(65) Prior Publication Data

US 2012/0054407 A1    Mar. 1, 2012

(51) Int. Cl.
*G06F 12/00* (2006.01)

(52) U.S. Cl.
USPC .......................................... 711/112; 711/114

(58) Field of Classification Search
USPC .................................. 711/112, 114
See application file for complete search history.

(56) References Cited

U.S. PATENT DOCUMENTS

| | | | |
|---|---|---|---|
| 7,447,939 B1 * | 11/2008 | Faulkner et al. | 714/6.13 |
| 8,001,352 B1 * | 8/2011 | Chatterjee et al. | 711/165 |
| 2006/0010169 A1 * | 1/2006 | Kitamura | 707/200 |
| 2007/0055713 A1 | 3/2007 | Nagai et al. | |
| 2008/0208923 A1 * | 8/2008 | Watanabe et al. | 707/202 |
| 2009/0203786 A1 * | 8/2009 | Waldron et al. | 514/560 |
| 2009/0204786 A1 * | 8/2009 | Igarashi et al. | 711/209 |
| 2010/0281230 A1 * | 11/2010 | Rabii et al. | 711/165 |
| 2012/0023300 A1 * | 1/2012 | Tremaine et al. | 711/162 |

* cited by examiner

*Primary Examiner* — Hashem Farrokh
(74) *Attorney, Agent, or Firm* — Mattingly & Malur, PC

(57) ABSTRACT

Embodiments of the invention provide object-based tier management to improve the allocation of objects to different media of different speeds based on access characteristics such as access frequency. One embodiment is directed to a method of managing object-based data in an information system which includes an application server and a storage system. The method comprises receiving a write command including a first data to be written into a virtual volume; identifying an object to which the first data corresponds; checking if a second data corresponding to the object has been stored in the virtual volume; if the second data has been stored in a page of the virtual volume, checking if the page which stores the second data has a vacancy area; and if the page has a vacancy area, writing the first data in the page which stores the second data.

17 Claims, 12 Drawing Sheets

204 — OBJECT ALLOCATION INFORMATION

| OBJECT NAME (301) | OBJECT ADDRESS (302) | MAPPING VOLUME NAME (303) | MAPPING VOLUME ADDRESS (304) | |
|---|---|---|---|---|
| TABLE A | 0 - 99 | M-VOL A | 0 - 99 | 305 |
| TABLE B | 0 - 99 | M-VOL A | 100 - 199 | 306 |
| TABLE C | 0 - 99 | M-VOL A | 200 - 299 | 307 |
| TABLE A | 100 - 199 | M-VOL A | 300 - 399 | 308 |

205 — MAPPING INFORMATION

| MAPPING VOLUME NAME (321) | MAPPING VOLUME ADDRESS (322) | VIRTUAL VOLUME NAME (323) | VIRTUAL VOLUME ADDRESS (324) | |
|---|---|---|---|---|
| M-VOL A | 0 - 99 | V-VOL A | 0 - 99 | 325 |
| M-VOL A | 100 - 199 | V-VOL A | 1000 - 1099 | 326 |
| M-VOL A | 200 - 299 | V-VOL A | 2000 - 2099 | 327 |
| M-VOL A | 300 - 399 | V-VOL A | 100 - 199 | 328 |

340 — READ COMMAND

| COMMAND TYPE (341) | VOLUME NAME (342) | VOLUME ADDRESS (343) |
|---|---|---|
| READ | M-VOL A | 300 - 303 |

360 — WRITE COMMAND

| COMMAND TYPE (361) | VOLUME NAME (362) | VOLUME ADDRESS (363) | DATA (364) |
|---|---|---|---|
| WRITE | M-VOL A | 300 - 303 | ABCD |

RAID GROUP INFORMATION

| RAID GROUP NAME (401) | MEDIA NAME (402) | MEDIA TYPE (403) | RAID LEVEL (404) |
|---|---|---|---|
| RG A | SSD A, SSD B, SSD C, SSD D | SSD | RAID 10 (2D+2D) | 405
| RG B | HDD A, HDD B, HDD C, HDD D | SAS HDD | RAID 5 (3D+1P) | 406
| RG C | HDD E, HDD F, HDD G, HDD H | SATA HDD | RAID 5 (3D+1P) | 407

223

LOGICAL VOLUME INFORMATION

| LOGICAL VOLUME NAME (421) | LOGICAL VOLUME ADDRESS (422) | MEDIA TYPE (423) | RAID GROUP NAME (424) | RAID GROUP ADDRESS (425) |
|---|---|---|---|---|
| L-VOL A | 0 - 999 | SSD | RG A | 0 - 999 | 426
| L-VOL B | 0 - 999 | SSD | RG A | 1000 - 1999 | 427
| L-VOL C | 0 - 999 | SAS HDD | RG B | 0 - 999 | 428
| L-VOL D | 0 - 999 | SAS HDD | RG B | 1000 - 1999 | 429

224

POOL INFORMATION

| POOL NAME (441) | LOGICAL VOLUME NAME (442) | VIRTUAL VOLUME NAME (443) |
|---|---|---|
| POOL A | L-VOL A, L-VOL B, L-VOL C | V-VOL A, V-VOL B, | 444
| POOL B | L-VOL D | V-VOL C | 445

VIRTUAL VOLUME INFORMATION

| VIRTUAL VOLUME NAME | PAGE NUMBER | VIRTUAL VOLUME ADDRESS | LOGICAL VOLUME NAME | LOGICAL VOLUME ADDRESS |
|---|---|---|---|---|
| V-VOL A | 1 | 0 - 299 | L-VOL A | 0 - 299 |
| V-VOL A | 2 | 300 - 599 | L-VOL C | 0 - 299 |
| V-VOL A | 3 | 600 - 899 | L-VOL C | 300 - 599 |
| V-VOL A | 4 | 900 - 1199 | NOT ALLOCATED | NOT ALLOCATED |
| V-VOL A | 5 | 1200 - 1499 | NOT ALLOCATED | NOT ALLOCATED |
| V-VOL B | 1 | 0 - 299 | NOT ALLOCATED | NOT ALLOCATED |

/226

TIER AND MEDIA DEFINITION INFORMATION

| TIER | MEDIA TYPE | DEFAULT MEDIA |
|---|---|---|
| 0 | SSD | |
| 1 | SAS HDD | X |
| 2 | SATA HDD | |

/540

READ COMMAND

| COMMAND TYPE | VOLUME NAME | VOLUME ADDRESS |
|---|---|---|
| READ | V-VOL A | 100 - 103 |

/560

WRITE COMMAND

| COMMAND TYPE | VOLUME NAME | VOLUME ADDRESS | DATA |
|---|---|---|---|
| WRITE | V-VOL A | 100 - 103 | ABCD |

Fig. 5

600 — TIER MANAGEMENT SCREEN

| TIER (601) | MEDIA TYPE (602) | DEFAULT MEDIA (603) | |
|---|---|---|---|
| 0 | SSD |  | 604 |
| 1 | SAS HDD | X | 605 |
| 2 | SATA HDD |  | 606 |
|  |  |  |  |
|  |  |  |  |

| OBJECT NAME (621) | TIER (622) | |
|---|---|---|
| TABLE A | 0 | 623 |
| TABLE B | 1 | 624 |
| INDEX A | 0 | 625 |
|  |  |  |
|  |  |  |

641 — OK

660 — TIER MOVE COMMAND

| VOLUME NAME (661) | PAGE NUMBER (662) | DESTINATION TIER (663) |
|---|---|---|
| V-VOL A | 1 | 1 |

Fig. 6

METHOD AND APPARATUS TO MANAGE OBJECT-BASED TIERS

BACKGROUND OF THE INVENTION

The present invention relates generally to storage systems involving thin provisioning and, more particularly, to methods and apparatus for managing object-based tiers.

In recent years, thin provisioning has become popular. Thin provisioning is a method for allocating fixed size area when a storage subsystem receives a write command to unallocated area. Prior art allows the storage subsystem to migrate frequently accessed allocated fixed size area to fast and expensive media and to migrate rarely accessed allocated fixed size area to slow and cheap media.

An application program frequently accesses some application objects and rarely accesses the other application objects. There are frequently accessed objects and infrequently accessed objects in one allocated fixed size area. As a result, the access frequency of the allocated fixed area becomes between frequent and infrequent. Therefore the frequently accessed objects are not moved to fast media and the infrequently accessed objects are not moved to cheap media.

BRIEF SUMMARY OF THE INVENTION

Exemplary embodiments of the invention provide object-based tier management to improve the allocation of objects to different media of different speeds based on access characteristics such as access frequency. An object allocation calculation program obtains the object allocation information and the allocated fixed area boundary information. A mapping program then aligns objects on an allocated fixed area boundary and maps the objects to the allocated fixed area based on object allocation information and the allocated fixed area boundary. A tier move program moves the allocated fixed area to a predefined tier based on the object name. As a result, only the frequently accessed objects are moved to the fast media and only the infrequently accessed objects are moved to the slow media, thereby improving the storage subsystem.

In specific embodiments, an object allocation calculation program gets object allocation information and allocated fixed area boundary information. A mapping program aligns objects on allocated fixed area boundary and maps the objects to the allocated fixed area. A tier move program moves allocated fixed area to predefined tier based on object name.

An aspect of the present invention is directed to a method of managing object-based data in an information system which includes an application server and a storage system, the storage system having a plurality of storage devices. The method comprises receiving a write command including a first data to be written into a virtual volume; identifying an object to which the first data corresponds; checking if a second data corresponding to the object has been stored in the virtual volume; if the second data has been stored in a page of the virtual volume, checking if the page which stores the second data has a vacancy area; and if the page has a vacancy area, writing the first data in the page which stores the second data.

In some embodiments, the method further comprises, if the second data has not been stored in the virtual volume or if the page which stores the second data has no vacancy area, mapping the first data into a new page for storing the first data. The virtual volume has a plurality of pages and each page corresponds to one of a plurality of tiers, the plurality of tiers corresponding to different types of storage media. The method further comprises determining if one of the pages is to be moved to a different tier; and if it is determined that one of the pages is to be moved to a different tier, moving the page to the different tier. Information on the tiers is updated, and the method further comprises moving one or more pages to different tiers based on the updated information on the tiers. The method further comprises obtaining a default storage media for the first data, the default storage media corresponding to a default tier; selecting a logical volume which corresponds to the default storage media, wherein the virtual volume to which the first data is to be written corresponds to the selected logical volume; and writing the first data to the virtual volume. The object is one of a plurality of objects; the virtual volume has a plurality of pages and each page corresponds to one of a plurality of tiers, the plurality of tiers corresponding to different types of storage media; and the method further comprises maintaining relationships between objects and files, between files and virtual volumes, between virtual volumes and logical volumes, and between logical volumes and tiers.

In specific embodiments, the write command includes a volume name and a volume address for the first data to be written to the virtual volume. The method further comprises checking mapping information to determine whether the volume name and the volume address in the write command have been allocated in the mapping information; if the volume name and the volume address in the write command have been allocated in the mapping information, obtaining a virtual volume name and a virtual volume address corresponding to the allocated volume name and the allocated volume address in the mapping information, the virtual volume name and the virtual volume address specifying the virtual volume to which the first data is to be written; and if the volume name and the volume address in the write command are unallocated in the mapping information, mapping an area of a virtual volume having a virtual volume name and a virtual volume address to an unallocated area of a mapping volume having the unallocated volume name and the unallocated volume address in the mapping information, the virtual volume name and the virtual volume address specifying the virtual volume to which the first data is to be written.

In some embodiments, checking if the page which stores the second data has a vacancy area comprises checking virtual volume information to search a vacancy area in the page which stores the second data. The virtual volume information includes for each virtual volume name, a plurality of pages, and for each of the plurality of pages, a virtual volume address, and a logical volume name and a logical volume address for a logical volume if allocated. The storage devices comprise SSD (solid state drive) and HDD (hard disk drive).

Another aspect of the invention is directed to a storage system in an information system for managing object-based data which includes an application server. The storage system comprises a processor; a memory; a plurality of storage devices; and a mapping module. The mapping module is configured to receive a write command including a first data to be written into a virtual volume; identify an object to which the first data corresponds; check if a second data corresponding to the object has been stored in the virtual volume; if the second data has been stored in a page of the virtual volume, check if the page which stores the second data has a vacancy area; and if the page has a vacancy area, write the first data in the page which stores the second data.

In some embodiments, the mapping module is configured to, if the second data has not been stored in the virtual volume or if the page which stores the second data has no vacancy area, map the first data into a new page for storing the first data. The mapping module is configured to determine if one of the pages is to be moved to a different tier. The storage system further comprises a tier move request module and a disk control module. The tier move request module is configured, if it is determined that one of the pages is to be moved to a different tier, to send a tier move command to the disk control module to move the page to the different tier.

In specific embodiments, information on the tiers is updated. The storage system further comprises a tier move request module and a disk control module. The tier move request module is configured to send a tier move command to the disk control module to move one or more pages to different tiers based on the updated information on the tiers. A disk control module is configured to obtain a default storage media for the first data, the default storage media corresponding to a default tier; and select a logical volume which corresponds to the default storage media, wherein the virtual volume to which the first data is to be written corresponds to the selected logical volume; wherein the first data is written to the virtual volume.

In some embodiments, the storage system further comprises a virtual volume information acquisition module configured to obtain virtual volume information. Checking by the mapping module if the page which stores the second data has a vacancy area comprises checking the virtual volume information to search a vacancy area in the page which stores the second data. The virtual volume information includes for each virtual volume name, a plurality of pages, and for each of the plurality of pages, a virtual volume address, and a logical volume name and a logical volume address for a logical volume if allocated.

These and other features and advantages of the present invention will become apparent to those of ordinary skill in the art in view of the following detailed description of the specific embodiments.

BRIEF DESCRIPTION OF THE DRAWINGS

FIG. 3 illustrates an example of the object allocation information and the mapping information in the storage subsystem of FIG. 1, a read command, and a write command.

FIG. 4 shows an example of the RAID group information, the logical volume information, and the pool information.

FIG. 5 shows an example of the virtual volume information, the tier and media definition information, a read command, and a write command.

FIG. 6 shows an example of a tier management screen and a tier move command.

DETAILED DESCRIPTION OF THE INVENTION

Figure 1:
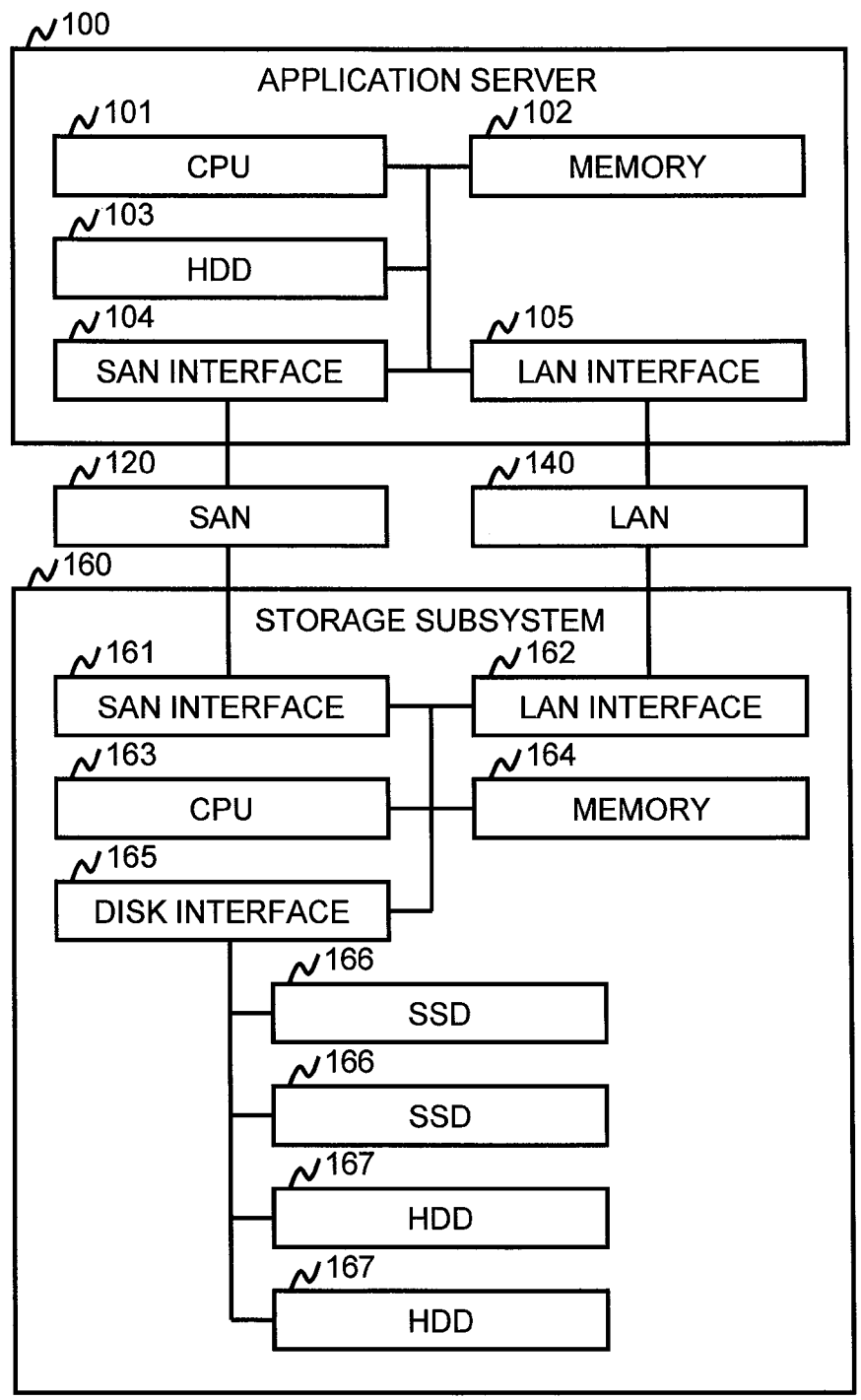
FIG. 1 illustrates an example of a hardware configuration of an information system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for object-based tier management.

System Configuration

FIG. 1 illustrates an example of a hardware configuration of an information system in which the method and apparatus of the invention may be applied. The system comprises an application server 100, a SAN (Storage Area Network) 120, a LAN (Local Area Network) 140, and a storage subsystem 160. The application server 100 comprises a CPU (Central Processing Unit) 101, a memory 102, a HDD (Hard Disk Drive) 103, a SAN interface 104, and a LAN interface 105. The CPU 101 reads programs from the memory 102 and executes the programs. The memory 102 reads programs and data from the HDD 103 when the application server 100 starts and stores the programs and the data. The HDD 103 stores programs and data. The SAN interface 104 connects the application server 100 and the SAN 120. The LAN interface 105 connects the application server 100 and the LAN 140. The SAN 120 connects the application server 100 and the storage subsystem 160. The application server 100 uses the SAN 120 to send application data to the storage subsystem 160 and receive application data from the storage subsystem 160. The LAN 140 connects the application server 100 and the storage subsystem 160. The application server 100 uses the LAN 140 to send management data to the storage subsystem 160 and receive management data from the storage subsystem 160. The storage subsystem 160 comprises a SAN interface 161, a LAN interface 162, a CPU 163, a memory 164, a disk interface 165, a SSD (Solid State Drive) 166, and a HDD 167. The SAN interface 161 connects the storage subsystem 160 and the SAN 120. The LAN interface 162 connects the storage subsystem 160 and the LAN 140. The CPU 163 reads programs from the memory 164 and executes the programs. The memory 164 reads programs and data from the HDD 167 and SSD 166 when the storage subsystem 160 starts and stores the programs and the data. The disk interface 165 connects the storage subsystem 160, the SSD 166, and the HDD 167. The SSD 166 stores programs and data. The HDD 167 stores programs and data.

Figure 2:
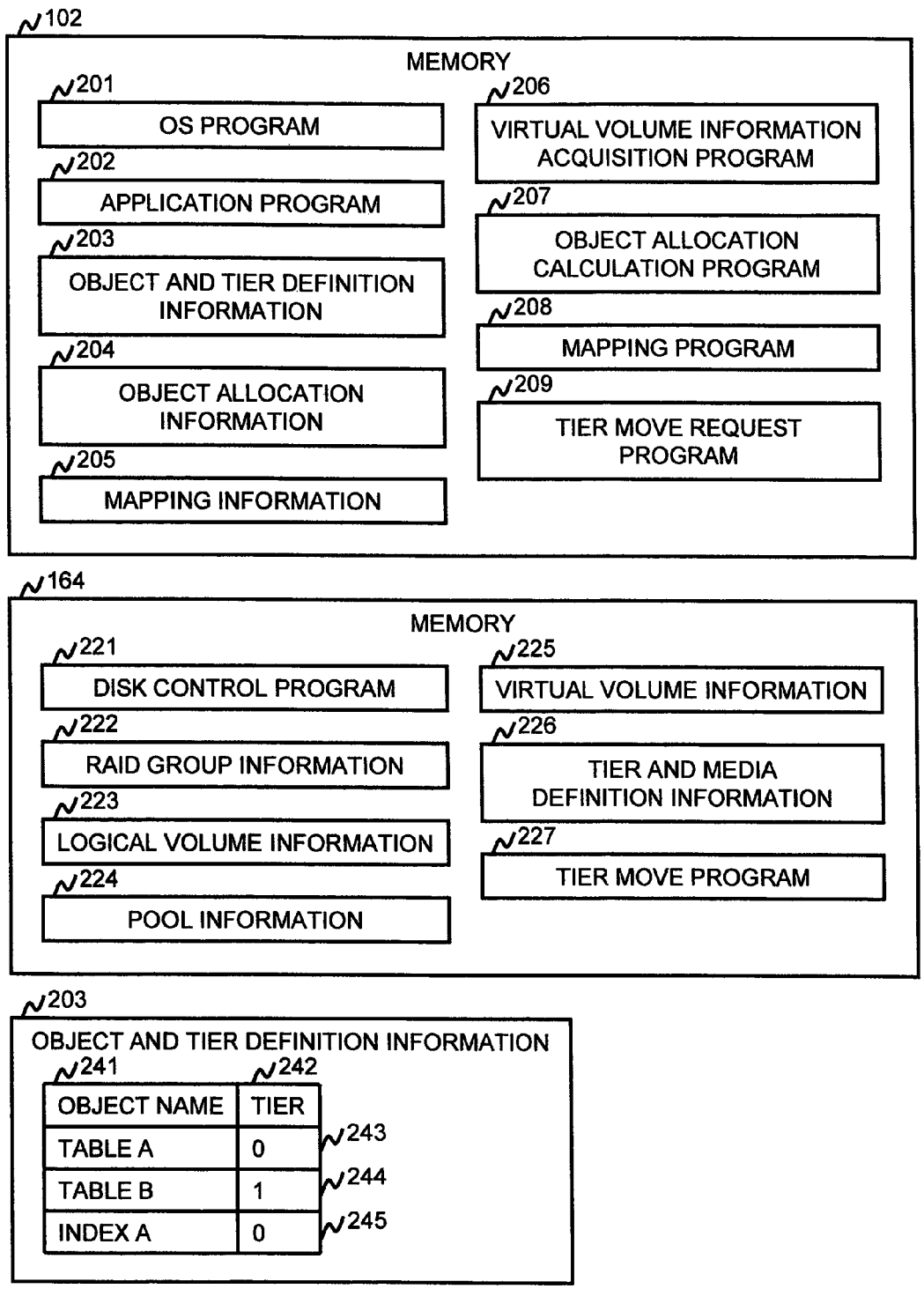
FIG. 2 illustrates an example of the memory in the application server and the memory in the storage subsystem of FIG. 1.

FIG. 2 illustrates an example of the memory 102 in the application server 100 and the memory 164 in the storage subsystem 160 of FIG. 1. The memory 102 comprises an OS (Operating System) program 201, an application program 202, object and tier definition information 203, object allocation information 204, mapping information 205, a virtual volume information acquisition program 206, an object allocation calculation program 207, a mapping program 208, and a tier move request program 209. The OS program 201 executes the application program 202. The application program 202 (e.g., database program) reads data from the storage subsystem 160, processes data, writes the results to the storage subsystem 160, and manages the object allocation information 204.

The object and tier definition information 203 includes columns of object name 241 and tier 242. For example, row 243 shows that "TABLE A" is allocated to tier "0." The object that is not defined in the object name 241 is allocated to tier "1." The object allocation information 204 includes a location where an object is saved. The mapping information 205 includes the relationship between a mapping volume on the application server 100 and a virtual volume on the storage subsystem 160.

The virtual volume information acquisition program 206 gets virtual volume information from the storage subsystem 160 via the LAN 140. The object allocation calculation program 207 calculates a location to which an object is allocated by the application server 100. The mapping program 208 makes mapping volume on the application server 100. The mapping program 208 maps the mapping volume to a virtual volume on the storage subsystem 160 based on the mapping information 205. The tier move request program 209 sends a tier move command 660 (see FIG. 6) to the storage subsystem 160 to move an area to another tier.

The memory 164 comprises a disk control program 221, RAID (Redundant Arrays of Inexpensive (or Independent) Disks) group information 222, logical volume information 223, pool information 224, virtual volume information 225, tier and media definition information 226, and a tier move program 227. The disk control program 221 receives read and write commands from the application server 100, reads data from the SSD 166 and the HDD 167, and writes data to the SSD 166 and the HDD 167 using the RAID group information 222, the logical volume information 223, the pool information 224, the virtual volume information 225, and the tier and media definition information 226. The tier move program 227 moves data to another tier.

FIG. 3 illustrates an example of the object allocation information 204 and the mapping information 205 in the storage subsystem 160 of FIG. 1, a read command 340, and a write command 360.

The object allocation information 204 is presented in a table form and includes columns of object name 301, object address 302, mapping volume name 303, and mapping volume address 304. For example, row 305 shows that the address from "0" to "99" in "TABLE A" is allocated to the address from "0" to "99" in "M-VOL A." The mapping information 205 is presented in a table form and includes columns of mapping volume name 321, mapping volume address 322, virtual volume name 323, and virtual volume address 324. For example, row 325 shows that the address from "0" to "99" in "M-VOL A" is allocated to the address from "0" to "99" in "V-VOL A."

The read command 340 includes a command type 341, a volume name 342, and a volume address 343. The read command 340 is sent from the application program 202 to the mapping program 208.

The write command 360 includes a command type 361, a volume name 362, a volume address 363, and data 364. The write command 360 is sent from the application program 202 to mapping program 208.

FIG. 4 shows an example of the RAID group information 222, the logical volume information 223, and the pool information 224.

The RAID group information 222 includes columns of RAID group name 401, media name 402, media type 403, and RAID level 404. For example, row 405 shows that "RG A" has "SSD A," "SSD B," "SSD C," and "SSD D," the media type of "RG A" is "SSD," and the RAID level of "RG A" is "RAID 10 (2D+2D)."

The logical volume information 223 includes columns of logical volume name 421, logical volume address 422, media type 423, RAID group name 424, and RAID group address 425. For example, row 426 shows that the media type of "L-VOL A" is "SSD" and "L-VOL A" is allocated to the address from "0" to "999" in "RG A."

The pool information 224 includes columns of pool name 441, logical volume name 442, and virtual volume name 443. For example, row 444 shows "POOL A" has "L-VOL A", "L-VOL B," and "L-VOL C," and the area of "POOL A" is used by "V-VOL A" and "V-VOL B."

FIG. 5 shows an example of the virtual volume information 225, the tier and media definition information 226, a read command 540, and a write command 560.

The virtual volume information 225 includes columns of virtual volume name 501, page number 502, virtual volume address 503, logical volume name 504, and logical volume address 505. For example, row 506 shows that the address from "0" to "229" in "V-VOL A" is allocated to the address from "0" to "229" in "L-VOL A."

The tier and media definition information 226 includes columns of tier 521, media type 522, and default media 523. For example, row 524 shows that an object defined with tier "0" is allocated to "SSD" media and "SSD" is not default media.

The read command 540 includes a command type 541, a volume name 542, and a volume address 543. The read command 540 is sent from the application server 100 to the storage subsystem 160.

The write command 560 includes a command type 561, a volume name 562, a volume address 563, and data 564. The write command 560 is sent from the application server 100 to the storage subsystem 160.

FIG. 6 shows an example of a tier management screen 600 and a tier move command 660. An administrator inputs a tier 601, a media type 602, a default media 603, an object name 621, and a tier 622. The tier and media definition information 226 and the object and tier definition information 203 are updated to the data input by the administrator when the administrator pushes an "OK" button 641. The tier move command 660 includes a volume name 661, a page number 662, and a destination tier 663. The tier move request program 209 sends the tier move command 660 to the disk control program 221. The disk control program 221 receives the tier move command 660, moves an area specified by the volume name 661 and the page number 662 to a tier specified by the destination tier 663, and updates the virtual volume information 225.

Figure 7:
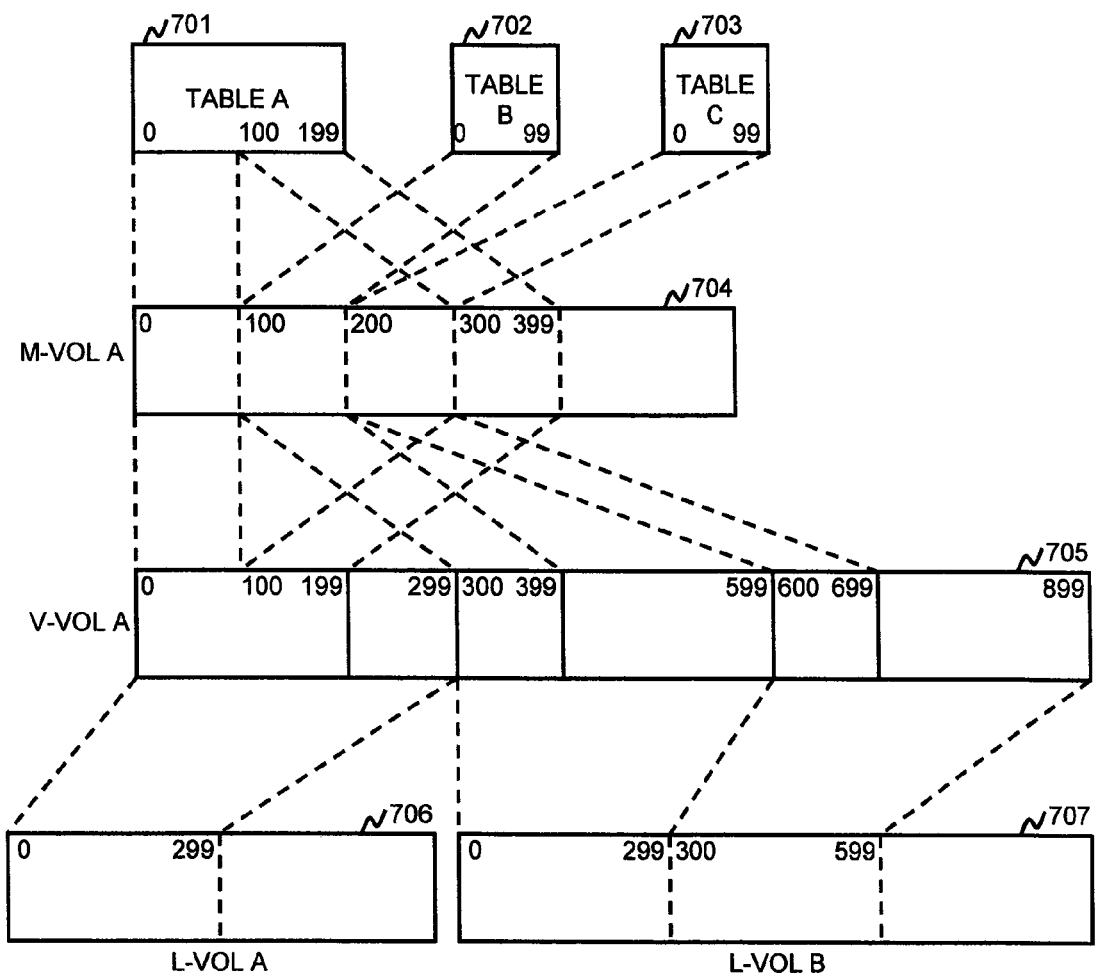
FIG. 7 shows an example of a diagram illustrating relationships between table and file, file and virtual volume, virtual volume and logical volume, and logical volume and RAID group.

FIG. 7 shows an example of a diagram illustrating relationships between table and file, file and virtual volume, virtual volume and logical volume, and logical volume and RAID group. FIG. 7 shows TABLE A 701, TABLE B 702, TABLE C 703, M-VOL A 704, V-VOL A 705, L-VOL A 706, L-VOL B 707. For example, the address "0" to "99" in the TABLE A 701 is mapped to the address "0" to "99" in the M-VOL A 704, the address "0" to "99" in the M-VOL A 704 is mapped to the address "0" to "99" in the V-VOL A 705, and the address "0" to "99" in the V-VOL A 705 is mapped to the address "0" to "99" in the L-VOL A 706.

Process Flow Diagrams

Figure 8:
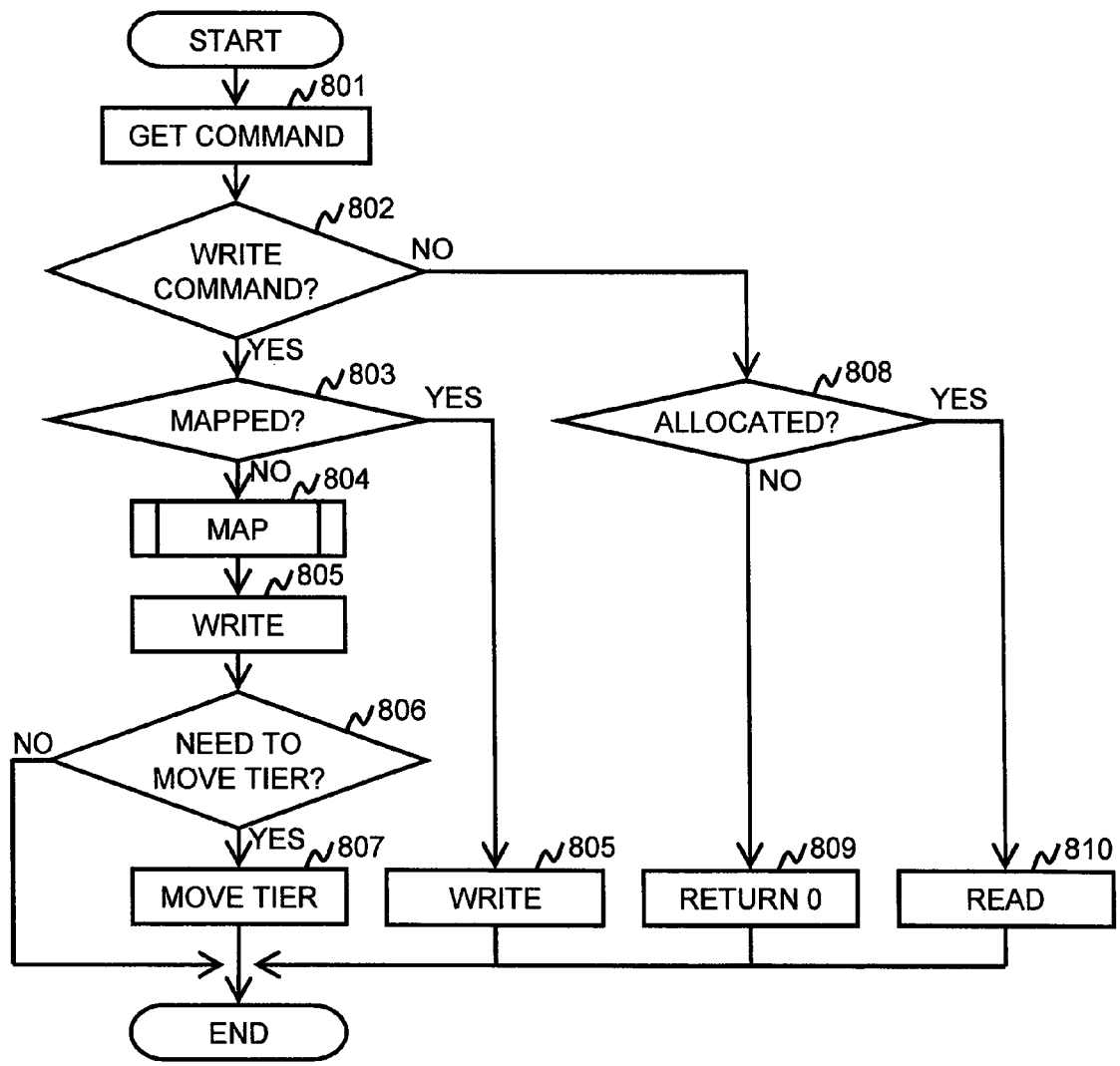
FIG. 8 is an example of a flow diagram showing that the mapping program reads data from the storage subsystem, and writes data to the storage subsystem when the mapping program receives the read command or the write command from the application program.

FIG. 8 is an example of a flow diagram showing that the mapping program 208 reads data from the storage subsystem 160, and writes data to the storage subsystem 160 when the mapping program 208 receives the read command 340 or the write command 360 from the application program 202.

In step 801, the mapping program 208 receives the read command 340 or the write command 360 from the application program 202. In step 802, if the command that the mapping program 208 received in step 801 is the write command 360, then the process goes to decision step 803; if not, then the process goes to decision step 808. In decision step 803, if the volume name 362 and the volume address 363 are allocated in the mapping information 205, then the process goes to step 805; if not, then the process goes to step 804. In step 804, the mapping program 208 maps an area of a virtual volume to an unallocated area of a mapping volume. In step 805, the mapping program 208 gets the volume name 362 and the volume address 363 from the write command 360, gets the virtual volume name 323 and the virtual volume address 324 from the mapping information 205, and creates the write command 560, and sends the write command 560 to the storage subsystem 160. In decision step 806, if the mapping program 208 mapped in step 907 of FIG. 9 (illustrating the process flow of step 804 in which step 907 represents mapping to an unallocated address of a virtual volume), then the process goes to step 807; if not, then the process ends. In step 807, the tier move request program 209 sends the tier move command 660 to the disk control program 221 to move the area of a virtual volume mapped in step 907 to a tier related to the object identified in step 901 from the object and tier definition information 203. In decision step 808, if the volume name 342 and the volume address 343 are allocated in the mapping information 205, then the process goes to step 810; if not, then the process goes to step 809. In step 809, the mapping program 208 returns "0" to the application program 202 because the area specified by the source volume name 342 and the volume address 343 are not that to which data is written. In step 810, the mapping program 208 gets the volume name 342 and the volume address 343 from the read command 340, gets the virtual volume name 323 and the virtual volume address 324 from the mapping information 205, and creates the read command 540, and sends the read command 540 to the storage subsystem 160.

Figure 9:
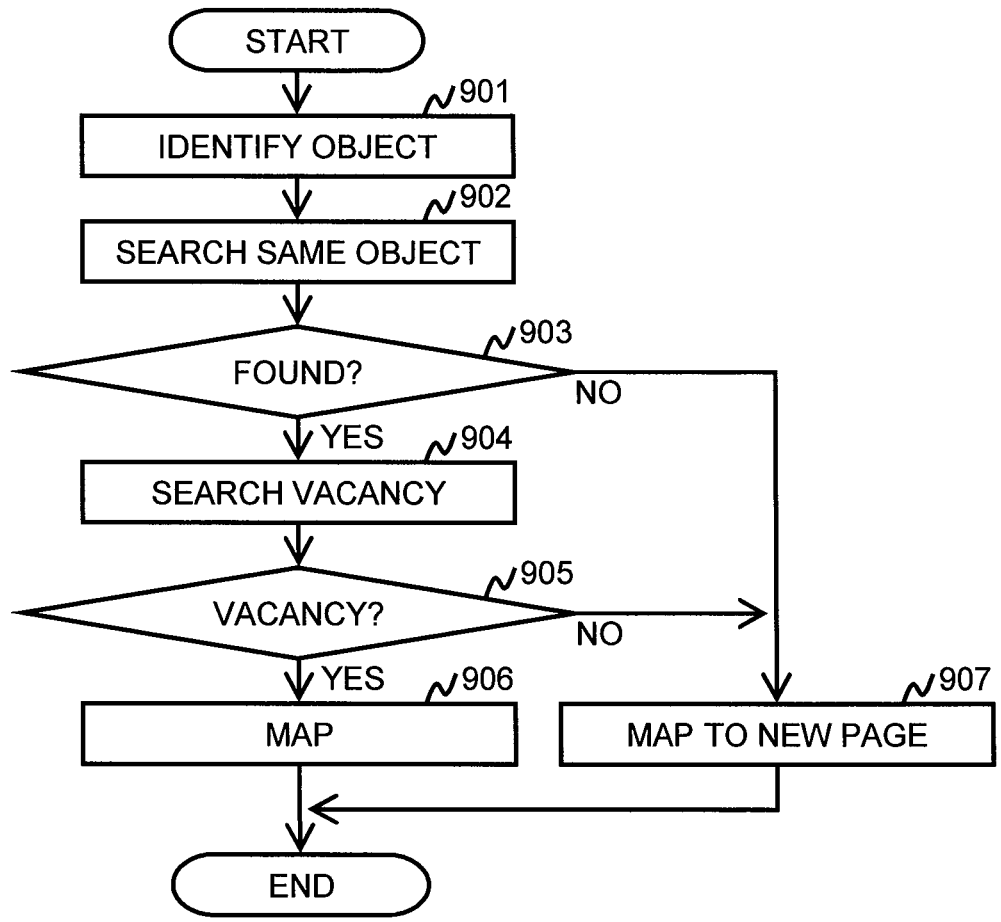
FIG. 9 is an example of a flow diagram showing the mapping program allocates an area of a virtual volume to an unallocated area of a mapping volume in step 804 of FIG. 8 in such a way that only one object is allocated on one page in a virtual volume.

FIG. 9 is an example of a flow diagram showing the mapping program 208 allocates an area of a virtual volume to an unallocated area of a mapping volume in step 804 of FIG. 8 in such a way that only one object is allocated on one page in a virtual volume.

In step 901, the mapping program 208 identifies the object to which the data 364 is written from the volume name 362, the volume address 363, and the object allocation information 204. For example, the volume name 362 is "M-VOL A" and the volume address 363 is "300" to "303" and the area "300" to "399" of "M-VOL A" corresponds to the address "100" to "199" of 'TABLE A." Therefore the data 364 is written to "TABLE A."

In step 902, the mapping program 208 searches the same object in other area(s) as the object identified in step 901 from the object allocation information 204 and mapping information 205. For example, the area "0" to "99" of "M-VOL A" and the area "304" to "399" are part of the same object in other areas.

In decision step 903, if the mapping program 208 found the same object in other area(s), then the process goes to decision step 904; if not, the process goes to step 907.

In step 904, the virtual volume information acquisition program 206 gets the virtual volume information 225 from the storage subsystem 160. The mapping program 208 searches a vacancy area in the same page from the virtual volume information 225.

In decision step 905, if the mapping program 208 found the vacancy area, then the process goes to step 906; if not, then the process goes to step 907.

In step 906, the mapping program 208 maps the address 363 of the volume name 362 to the address found in step 904 and updates the mapping information 205.

In step 907, the mapping program 208 maps the address 363 of the volume name 362 to an unallocated address of a virtual volume (i.e., a new page) and updates the mapping information 205.

Figure 10:
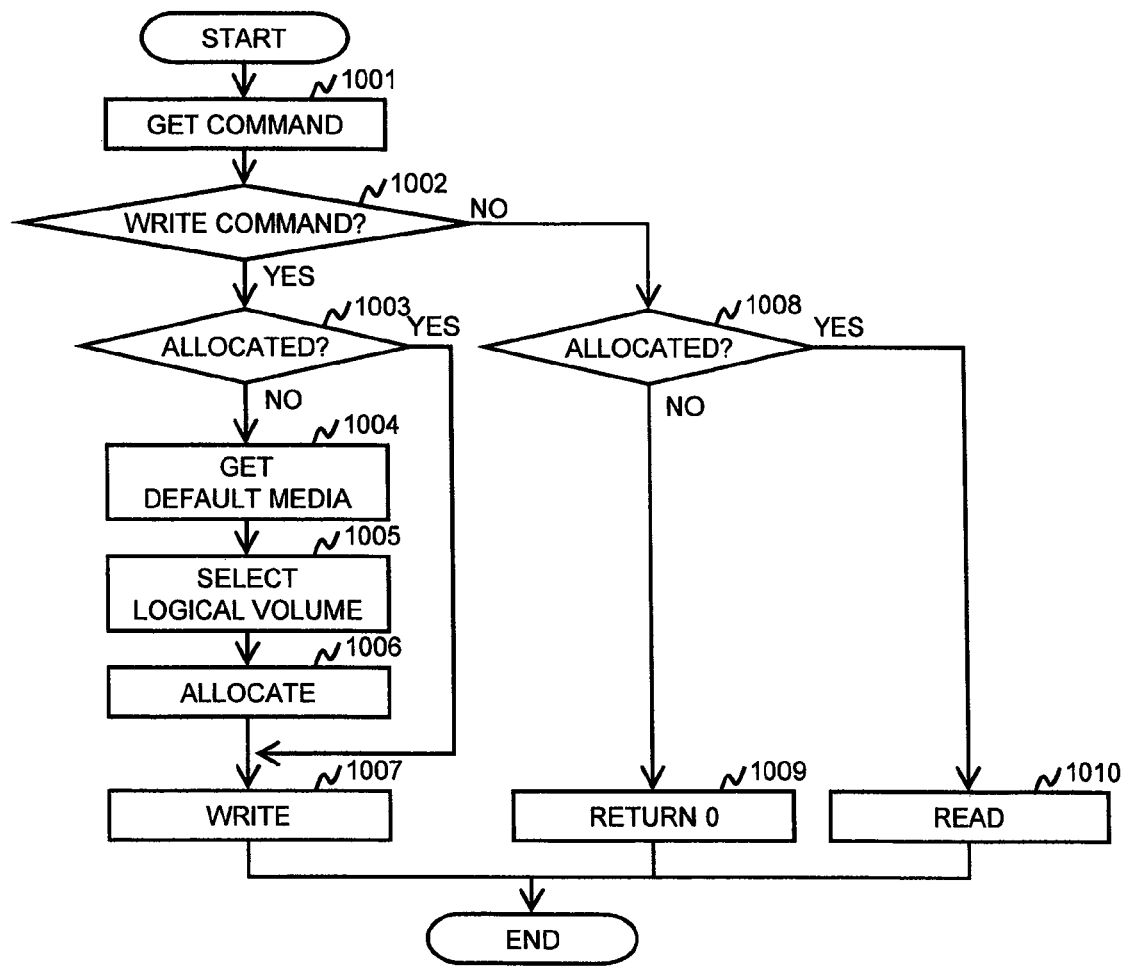
FIG. 10 is an example of a flow diagram showing that the storage subsystem reads data from the SSD and the HDD, and writes data to the SSD and the HDD when the storage subsystem receives the read command or the write command from the application server.

FIG. 10 is an example of a flow diagram showing that the storage subsystem 160 reads data from the SSD 166 and the HDD 167, and writes data to the SSD 166 and the HDD 167 when the storage subsystem 160 receives the read command 340 or the write command 360 from the application server 100.

In step 1001, the disk control program 221 receives the read command 340 or the write command 360 from the application server 100. In step 1002, if the command that the disk control program 221 received in step 1001 is the write command 360, then the process goes to decision step 1003; if not, then the process goes to decision step 1008. In decision step 1003, if the volume name 362 and the volume address 363 are allocated in the virtual volume information 225, then the process goes to step 1007; if not, then the process goes to step 1004.

In step 1004, the disk control program 221 gets a default media. For example, in the tier and media definition information 226 of FIG. 5, the default media 523 in row 525 is "X" and the media type 522 in row 524 is "SAS HDD." Therefore the default media is "SAS HDD." In step 1005, the disk control program 221 selects a logical volume from the logical volume information 223 for which the media type 403 is the default media that the disk control program 221 obtained in step 1004. In step 1006, the disk control program 221 allocates an area that the disk control program 221 selected as the logical volume in step 1005 to a virtual volume and updates the virtual volume information 225.

In step 1007, the disk control program 221 gets the volume name 362 and the volume address 363 from the write command 360, gets the logical volume name 503 and the logical volume address from the virtual volume information 225, gets the RAID group name 424 and the RAID group address 425 from the logical volume information 223, gets the media name 402 from the RAID group information 222, and writes the data 364 the SSD 166 and/or the HDD 167. In decision step 1008, if the volume name 342 and the volume address 343 are allocated in the virtual volume information 225, then the process goes to step 1010; if not, then the process goes to step 1009. In step 1009, the disk control program 221 returns "0" to the application server 100 because the area specified by the volume name 342 and the volume address 343 are not that to which data is written. In step 1010, the disk control program 221 gets the volume name 342 and the volume address 343 from the read command 340, gets the logical volume name 504 and the logical volume address 505 from the virtual volume information 225, gets the RAID group name 424 and the RAID group address 425 from the logical volume information 223, gets the media name 402 from the RAID group information 222, and reads data from the SSD 166 and/or the HDD 167.

Figure 11:
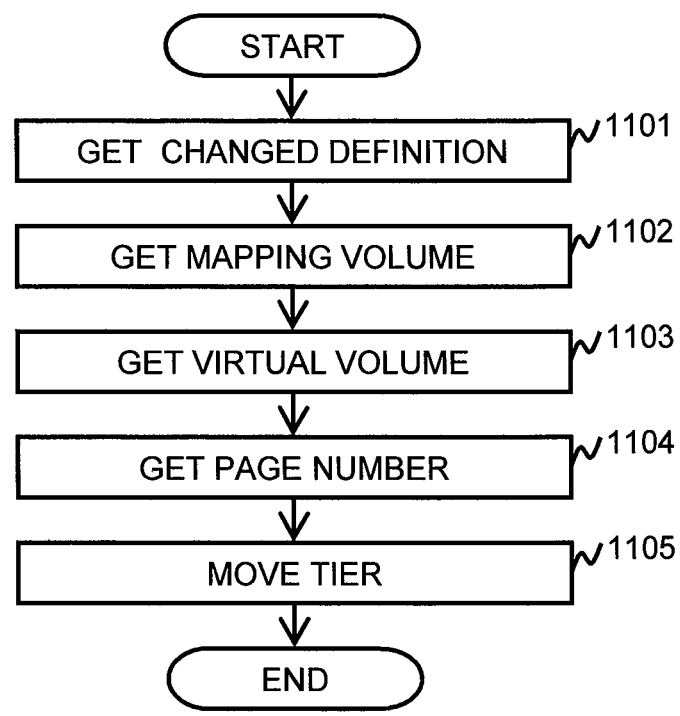
FIG. 11 is an example of a flow diagram showing tier migration when the object and tier definition information or the tier and media definition information is changed using the tier management screen.

FIG. 11 is an example of a flow diagram showing tier migration when the object and tier definition information 203 or the tier and media definition information 226 is changed using the tier management screen 600.

In step 1101, the object allocation calculation program 207 gets the object name 621 and the tier 622 from changed rows in the tier management screen 600.

In step 1102, the object allocation calculation program 207 gets from the object allocation information 204 the mapping volume name 303 and the mapping volume address 304 related to the object name 621 obtained in step 1101.

In step 1103, the object allocation calculation program 207 gets from the mapping information 205 the virtual volume name 323 and the virtual volume address 324 related to the mapping volume name 303 and the mapping volume address 304 obtained in step 1102.

In step 1104, the virtual volume information acquisition program 206 gets the virtual volume information 225 from the storage subsystem 160. The object allocation calculation program 207 gets from the virtual volume information 225 the page number 502 related to the virtual volume name 323 and the virtual volume address 324 obtained in step 1103.

In step 1105, the tier move request program 209 sends the virtual volume name 323, the page number 502 obtained in step 1104, and the tier 622 obtained in 1101 as the tier move command 660 to the disk control program 221.

Figure 12:
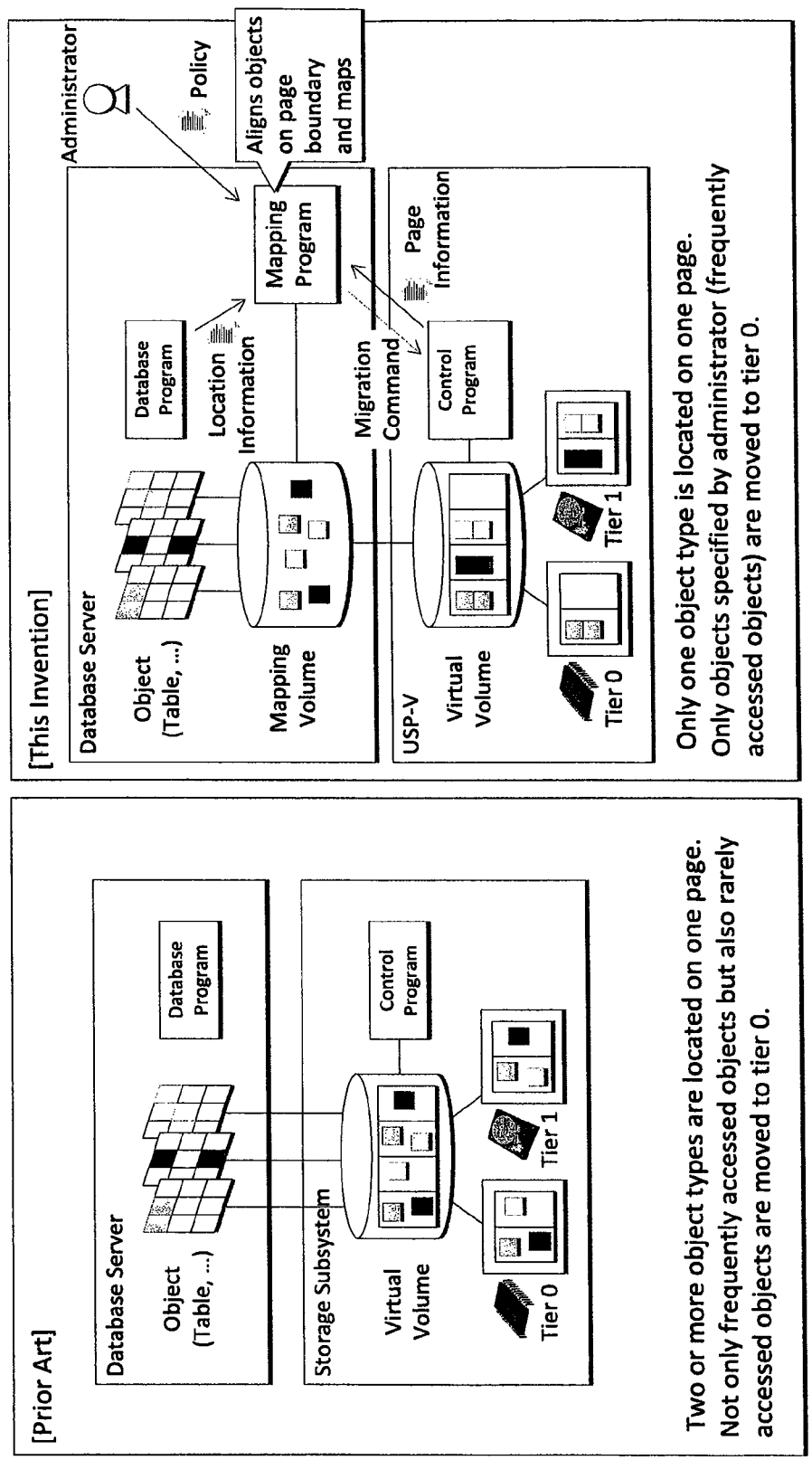
FIG. 12 is a schematic illustration of an aspect of the present invention distinguishing it from the prior art.

FIG. 12 is a schematic illustration of an aspect of the present invention distinguishing it from the prior art. In the prior art, two or more different types of objects are located on the same page. Not only frequently accessed objects but also rarely accessed objects are moved to Tier 0. In contrast, according to one aspect of the present invention, only one type of objects is located on one page (i.e., no mixing of different types of objects). Only objects specified by the administrator (frequently accessed objects) are moved to Tier 0. As a result, only the frequently accessed objects are moved to the fast media and only the infrequently accessed objects are moved to the slow media, thereby improving the storage subsystem.

Of course, the system configurations illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for object-based tier management. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method of managing object-based data in an information system which includes an application server and a storage system, the storage system having a plurality of storage devices, the method comprising:
   receiving a write command including a first data to be written into a virtual volume;
   identifying an object to which the first data corresponds;
   checking if a second data corresponding to the object has been stored in the virtual volume;
   if the second data has been stored in a page of the virtual volume, checking if the page which stores the second data has a vacancy area; and
   if the page has a vacancy area, writing the first data in the page which stores the second data; and
   wherein the object is one of a plurality of objects;
   wherein the virtual volume has a plurality of pages and each page corresponds to one of a plurality of tiers, the plurality of tiers corresponding to different types of storage media; and
   wherein the method further comprises maintaining relationships between objects and files, between files and virtual volumes, between virtual volumes and logical volumes, and between logical volumes and tiers.

2. The method according to claim 1, further comprising:
   if the second data has not been stored in the virtual volume or if the page which stores the second data has no vacancy area, mapping the first data into a new page for storing the first data.

3. The method according to claim 1, further comprising:
   determining if one of the pages is to be moved to a different tier; and
   if it is determined that one of the pages is to be moved to a different tier, moving the page to the different tier.

4. The method according to claim 1, wherein information on the tiers is updated, the method further comprising:
   moving one or more pages to different tiers based on the updated information on the tiers.

5. The method according to claim 1, further comprising:
   obtaining a default storage media for the first data, the default storage media corresponding to a default tier;
   selecting a logical volume which corresponds to the default storage media, wherein the virtual volume to which the first data is to be written corresponds to the selected logical volume; and
   writing the first data to the virtual volume.

6. The method according to claim 1, wherein the write command includes a volume name and a volume address for the first data to be written to the virtual volume, the method further comprising:
   checking mapping information to determine whether the volume name and the volume address in the write command have been allocated in the mapping information;
   if the volume name and the volume address in the write command have been allocated in the mapping information, obtaining a virtual volume name and a virtual volume address corresponding to the allocated volume name and the allocated volume address in the mapping information, the virtual volume name and the virtual volume address specifying the virtual volume to which the first data is to be written; and
   if the volume name and the volume address in the write command are unallocated in the mapping information, mapping an area of a virtual volume having a virtual volume name and a virtual volume address to an unallocated area of a mapping volume having the unallocated volume name and the unallocated volume address in the mapping information, the virtual volume name and the virtual volume address specifying the virtual volume to which the first data is to be written.

7. The method according to claim 1,
   wherein checking if the page which stores the second data has a vacancy area comprises checking virtual volume information to search a vacancy area in the page which stores the second data; and
   wherein the virtual volume information includes for each virtual volume name, a plurality of pages, and for each of the plurality of pages, a virtual volume address, and a logical volume name and a logical volume address for a logical volume if allocated.

8. The method according to claim 1,
   wherein the storage devices comprise SSD (solid state drive) and HDD (hard disk drive).

9. A storage system in an information system for managing object-based data which includes an application server, the storage system comprising:
   a processor;
   a memory;
   a plurality of storage devices; and a mapping module configured to
receive a write command including a first data to be written into a virtual volume;
identify an object to which the first data corresponds;
check if a second data corresponding to the object has been stored in the virtual volume;
if the second data has been stored in a page of the virtual volume, check if the page which stores the second data has a vacancy area; and
if the page has a vacancy area, write the first data in the page which stores the second data; and
further comprising a disk control module which is configured to:
obtain a default storage media for the first data, the default storage media corresponding to a default tier; and
select a logical volume which corresponds to the default storage media, wherein the virtual volume to which the first data is to be written corresponds to the selected logical volume;
wherein the first data is written to the virtual volume.

10. The storage system according to claim 9, wherein the mapping module is configured to
if the second data has not been stored in the virtual volume or if the page which stores the second data has no vacancy area, map the first data into a new page for storing the first data.

11. The storage system according to claim 9,
wherein the virtual volume has a plurality of pages and each page corresponds to one of a plurality of tiers, the plurality of tiers corresponding to different types of storage media.

12. The storage system according to claim 11,
wherein the mapping module is configured to determine if one of the pages is to be moved to a different tier;
wherein the storage system further comprises a tier move request module and a disk control module; and
wherein the tier move request module is configured, if it is determined that one of the pages is to be moved to a different tier, to send a tier move command to the disk control module to move the page to the different tier.

13. The storage system according to claim 11,
wherein information on the tiers is updated;
wherein the storage system further comprises a tier move request module and a disk control module; and
wherein the tier move request module is configured to send a tier move command to the disk control module to move one or more pages to different tiers based on the updated information on the tiers.

14. The storage system according to claim 9,
wherein the object is one of a plurality of objects;
wherein the virtual volume has a plurality of pages and each page corresponds to one of a plurality of tiers, the plurality of tiers corresponding to different types of storage media; and
wherein the memory stores relationships between objects and files, between files and virtual volumes, between virtual volumes and logical volumes, and between logical volumes and tiers.

15. The storage system according to claim 9, wherein the write command includes a volume name and a volume address for the first data to be written to the virtual volume, wherein the mapping module is configured to:
check mapping information to determine whether the volume name and the volume address in the write command have been allocated in the mapping information;
if the volume name and the volume address in the write command have been allocated in the mapping information, obtain a virtual volume name and a virtual volume address corresponding to the allocated volume name and the allocated volume address in the mapping information, the virtual volume name and the virtual volume address specifying the virtual volume to which the first data is to be written; and
if the volume name and the volume address in the write command are unallocated in the mapping information, map an area of a virtual volume having a virtual volume name and a virtual volume address to an unallocated area of a mapping volume having the unallocated volume name and the unallocated volume address in the mapping information, the virtual volume name and the virtual volume address specifying the virtual volume to which the first data is to be written.

16. The storage system according to claim 9,
wherein the storage system further comprises a virtual volume information acquisition module configured to obtain virtual volume information;
wherein checking by the mapping module if the page which stores the second data has a vacancy area comprises checking the virtual volume information to search a vacancy area in the page which stores the second data; and
wherein the virtual volume information includes for each virtual volume name, a plurality of pages, and for each of the plurality of pages, a virtual volume address, and a logical volume name and a logical volume address for a logical volume if allocated.

17. The storage system according to claim 9,
wherein the storage devices comprise SSD (solid state drive) and HDD (hard disk drive).

* * * * *